(12) United States Patent
Hanover et al.

(10) Patent No.: US 12,216,292 B2
(45) Date of Patent: *Feb. 4, 2025

(54) AUTOMATED VIDEO CAPTURE AND COMPOSITION SYSTEM

(71) Applicant: Snap Inc., Santa Monica, CA (US)

(72) Inventors: Matthew Hanover, Los Angeles, CA (US); Richard Zhuang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/731,823

(22) Filed: Apr. 28, 2022

(65) Prior Publication Data
US 2022/0252894 A1    Aug. 11, 2022

Related U.S. Application Data

(63) Continuation of application No. 16/585,603, filed on Sep. 27, 2019, now Pat. No. 11,320,667.

(51) Int. Cl.
*G02B 27/64* (2006.01)
*G02B 27/01* (2006.01)
*H04N 1/00* (2006.01)

(52) U.S. Cl.
CPC ............ *G02B 27/64* (2013.01); *G02B 27/017* (2013.01); *H04N 1/00246* (2013.01); *G02B 2027/0138* (2013.01)

(58) Field of Classification Search
CPC .................. G02B 27/64; G02B 27/017; G02B 2027/0138; H04N 1/00246
See application file for complete search history.

(56) References Cited

U.S. PATENT DOCUMENTS 10,306,289 B1    5/2019    Chalmers et al.
10,432,874 B2*  10/2019    Brook .................... H04N 23/45
(Continued)

FOREIGN PATENT DOCUMENTS

AU    2017220404 A1    7/2018
KR    20130069123 A    6/2013
(Continued)

OTHER PUBLICATIONS

International Search Report and Written Opinion for International Application No. PCT/US2020/047886, dated Nov. 25, 2020 (Nov. 25, 2020)—17 pages.
(Continued)

*Primary Examiner* — Minh Q Phan
(74) *Attorney, Agent, or Firm* — CM Law; Stephen J. Weed

(57) ABSTRACT

Systems, devices, media, and methods are described for capturing a series of video clips, together with position, orientation, and motion data collected from an inertial measurement unit during filming. The methods in some examples include calculating camera orientations based on the data collected, computing a stabilized output path based on the camera orientations, and then combining the video segments in accordance with said stabilized output path to produce a video composition that is stable, short, and easy to share. The video clips are filmed in accordance with a set of conditions called a capture profile. In some implementations, the capture profile conditions are reactive, adjusting in real time, during filming, in response to sensor data gathered in real time from a sensor array.

17 Claims, 10 Drawing Sheets

(56) References Cited

U.S. PATENT DOCUMENTS

| | | |
|---|---|---|
| 11,320,667 B2 | 5/2022 | Hanover et al. |
| 2012/0212414 A1 | 8/2012 | Osterhout et al. |
| 2014/0294366 A1 | 10/2014 | Fletchall |
| 2015/0248916 A1 | 9/2015 | Kopf et al. |
| 2016/0057345 A1 | 2/2016 | Lapstun et al. |
| 2016/0286210 A1 | 9/2016 | Border et al. |
| 2016/0323565 A1 | 11/2016 | Van Baarsen et al. |
| 2016/0343402 A1 | 11/2016 | Singhal et al. |
| 2017/0028935 A1 | 2/2017 | Dutta et al. |
| 2018/0259339 A1 | 9/2018 | Johnson et al. |
| 2018/0338126 A1 | 11/2018 | Trevor et al. |

FOREIGN PATENT DOCUMENTS

| | | |
|---|---|---|
| KR | 20190008944 A | 1/2019 |
| WO | 2017040633 A1 | 3/2017 |

OTHER PUBLICATIONS

European Search Report for European Application No. 20867512.4, dated Oct. 27, 2023 (Oct. 27, 2023)—9 pages.

1st Korean Office Action for South Korean Application No. 10-2022-7013839, dated Jul. 4, 2024 (Jul. 4, 2024)—6 pages (English translation—6 pages).

\* cited by examiner

AUTOMATED VIDEO CAPTURE AND COMPOSITION SYSTEM

CROSS-REFERENCE TO RELATED APPLICATIONS

This application is a Continuation of U.S. application Ser. No. 16/585,603 filed on Sep. 27, 2019, the contents of which are incorporated fully herein by reference.

TECHNICAL FIELD

Examples set forth in the present disclosure relate to portable electronic devices, including wearable devices such as eyewear. More particularly, but not by way of limitation, the present disclosure describes systems and methods for capturing a series of raw video segments and combining the segments to produce a video composition.

BACKGROUND

Many types of computers and electronic devices available today, including mobile devices (e.g., smartphones, tablets, and laptops) and wearable devices (e.g., smartglasses, digital eyewear, headwear, headgear, and head-mounted displays), include one or more cameras for capturing still photographs and video as well as internal sensors for collecting information about the location, orientation, motion, and heading of the device.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
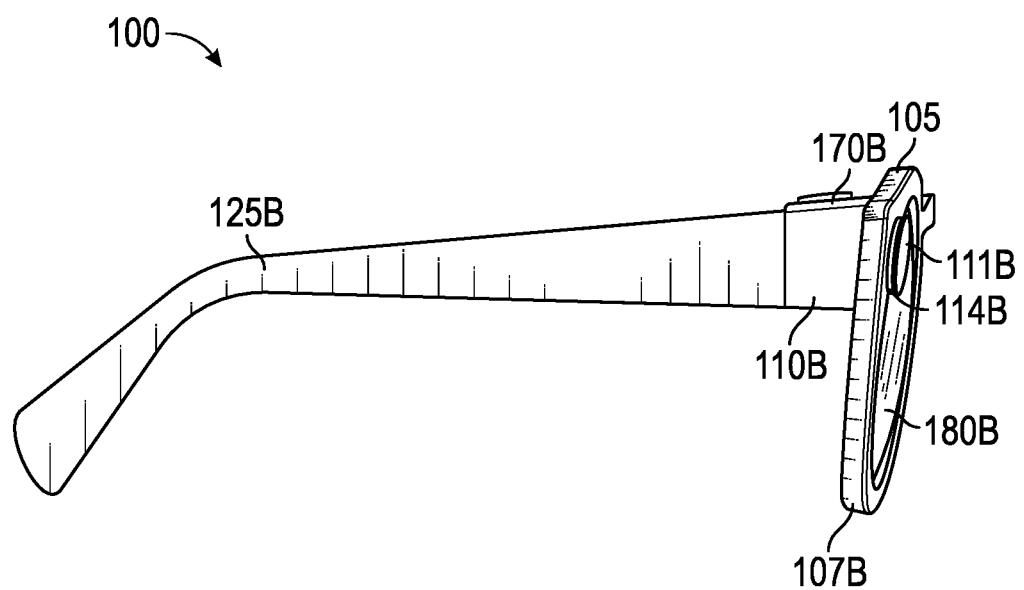
FIG. 1A is a side view (right) of an example hardware configuration of an eyewear device that may be utilized in a video composition and sharing system.

Various implementations and details are described with reference to an example: a video composition and sharing system for capturing a series of raw video segments with a portable electronic device, calculating a camera orientation based on information from device sensors, computing a stabilized output path, and combining the segments to produce a video composition. For calculating the camera orientation during recording, the portable device includes an inertial measurement unit comprising a digital accelerometer, gyroscope, and magnetometer. The camera orientations can be used to compute a stabilized output path, a hypothetical course traveled by the camera and extending along and through the series of raw video segments. Combining the segments along the stabilized output path produces a video composition that is relatively stable, short, and easy to share.

Vigorous user activities, such as skiing or cycling, can be difficult to capture using a portable electronic device. In many cases, the user's hands are engaged in doing the activity and not available to operate the controls on a device. High-resolution video files are often large and difficult to process on a portable device. The video recordings can be shaky, uneventful, and too long or tedious to be suitable for sharing with others. Examples described herein are useful, for example, in capturing vigorous user activities.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or otherwise supported by the element.

The orientations of the eyewear device, associated components and any complete devices incorporating a three-dimensional camera such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to direction or orientation of any three-dimensional camera or component of the three-dimensional camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

A wide variety of visible-light cameras are integrated into portable electronic devices, including mobile phones and wearable devices like smartglasses. A stereo camera has two lenses or includes two cameras working together, each with its own image sensor or film frame. A stereo camera captures two images of the same scene, taken from slightly different perspectives because the lenses are spaced apart. The separation distance between the lenses may be sized to approximate the distance between a person's eyes, to better simulate human binocular vision. A stereo camera captures two separate images of the same scene, taken from slightly different perspectives.

Reference now is made in detail to the examples illustrated in the accompanying drawings and discussed below.

FIG. 1A is a side view (right) of an example hardware configuration of an eyewear device 100 utilized in a video composition and sharing system, as described herein, which shows a right visible-light camera 114B for gathering image information. As further described below, two cameras 114A, 114B capture image information for a scene from two separate viewpoints. The two captured images may be used to project a three-dimensional display onto a screen for viewing with 3D glasses.

Figure 1B:
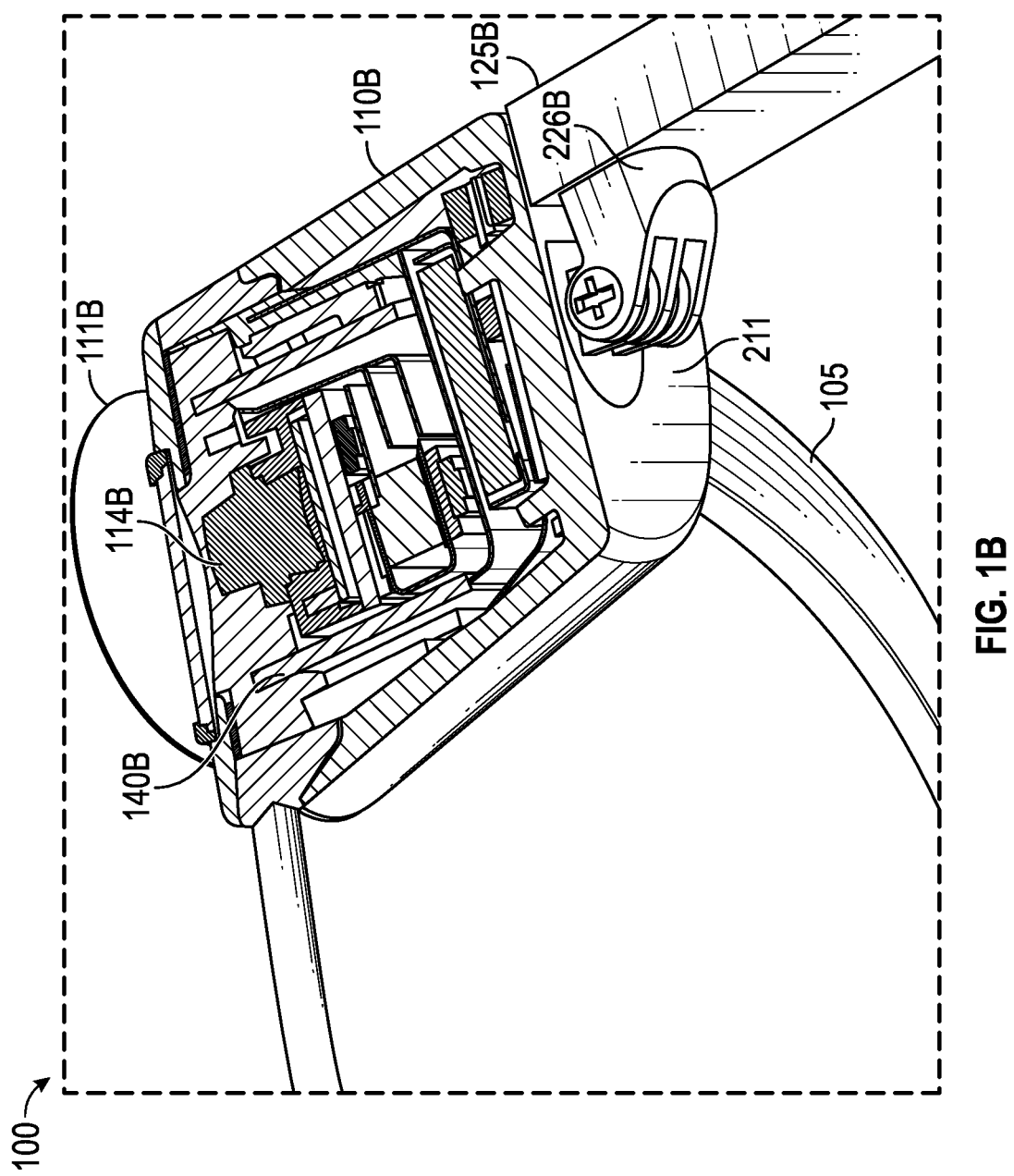
FIG. 1B is a top, partly sectional view of a right chunk of the eyewear device of FIG. 1A depicting a right visible-light camera, and a circuit board.
Figure 1C:
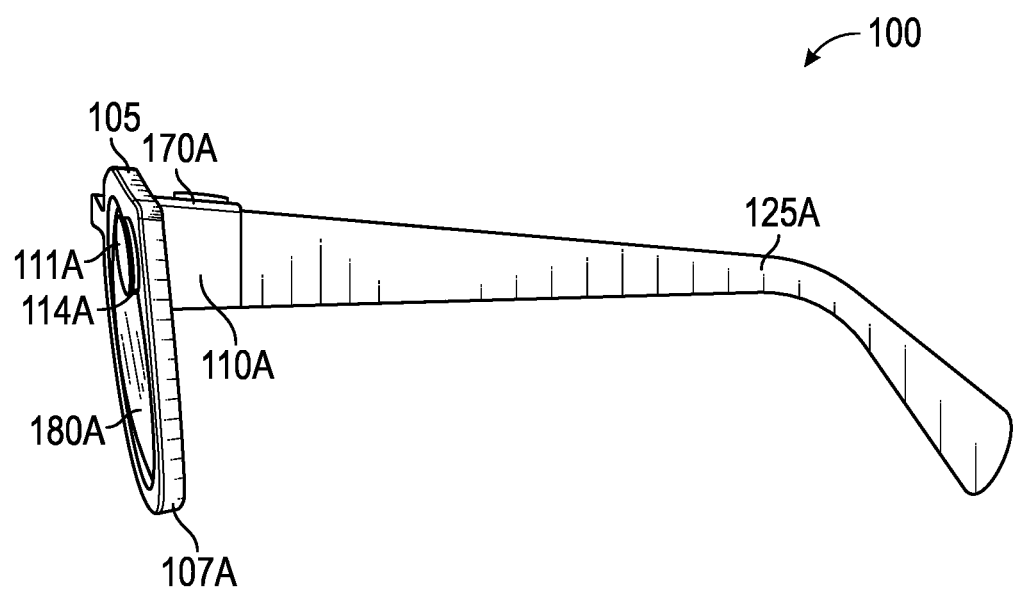
FIG. 1C is a side view (left) of an example hardware configuration of the eyewear device of FIG. 1A, which shows a left visible-light camera.
Figure 1D:
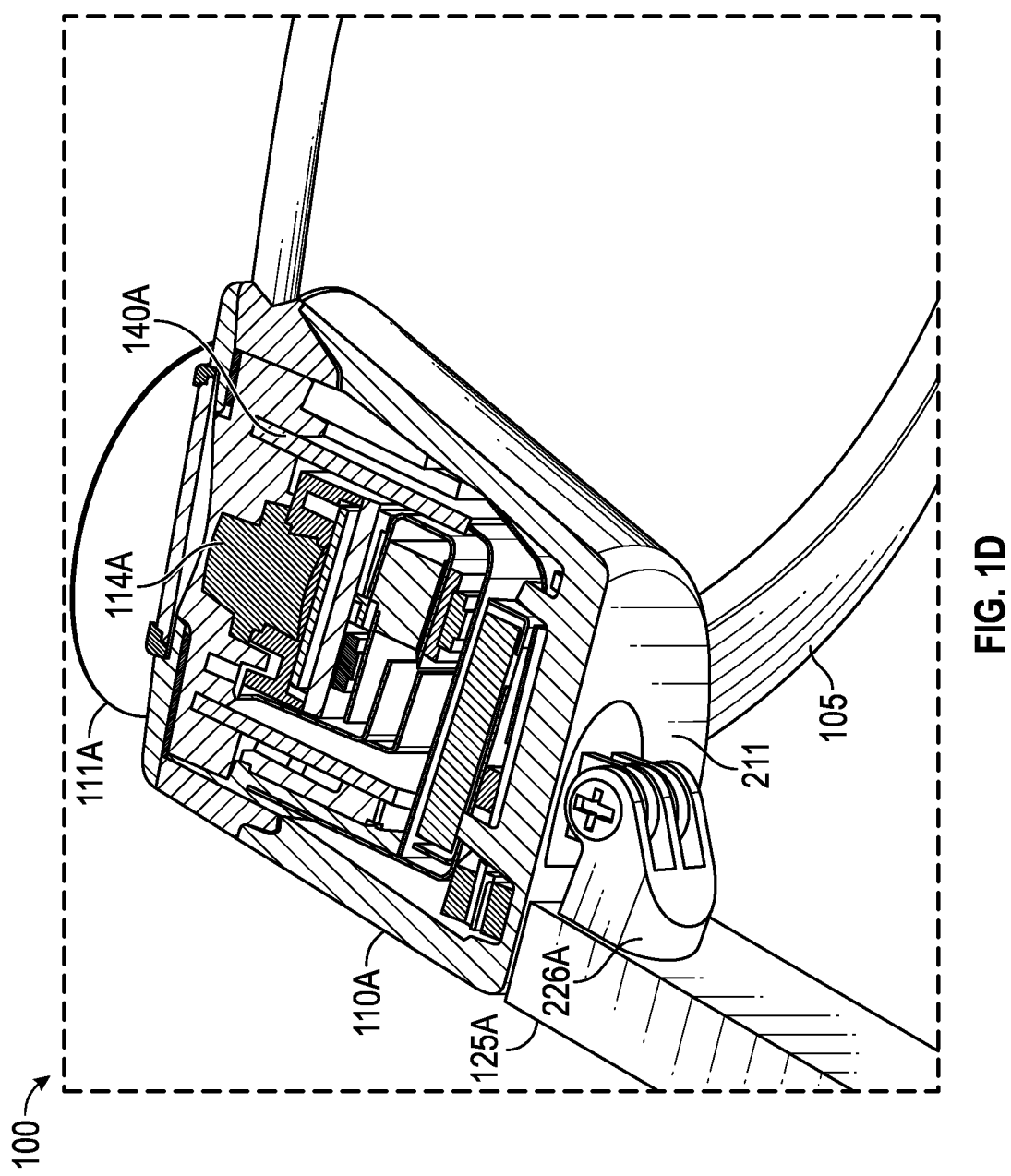
FIG. 1D is a top, partly sectional view of a left chunk of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right chunk 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 813. Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 220 (see FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); and/or record high-definition video at a high frame rate (e.g., thirty to sixty frames per second or more) and store the recording at a resolution of 1216 bp 1216 pixels (or greater).

The eyewear device 100 may capture image sensor data from the visible-light cameras 114A, 114B along with geolocation data, digitized by an image processor, for storage in a memory. The left and right raw images captured by respective visible-light cameras 114A, 114B are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, and/or a blue pixel light value); and a position attribute (e.g., an X-axis coordinate and a Y-axis coordinate).

In order to capture stereo images for later display as a three-dimensional projection, the image processor 912 (shown in FIG. 4) may be coupled to the visible-light cameras 114A, 114B to receive and store the visual image information. A timestamp for each image may be added by the image processor 912 or another processor which controls operation of the visible-light cameras 114A, 114B, which act as a stereo camera to simulate human binocular vision. The timestamp on each pair of images allows the images to be displayed together as part of a three-dimensional projection. Three-dimensional projections create an immersive, life-like experience that is desirable in a variety of contexts, including virtual reality (VR) and video gaming.

Figure 3:
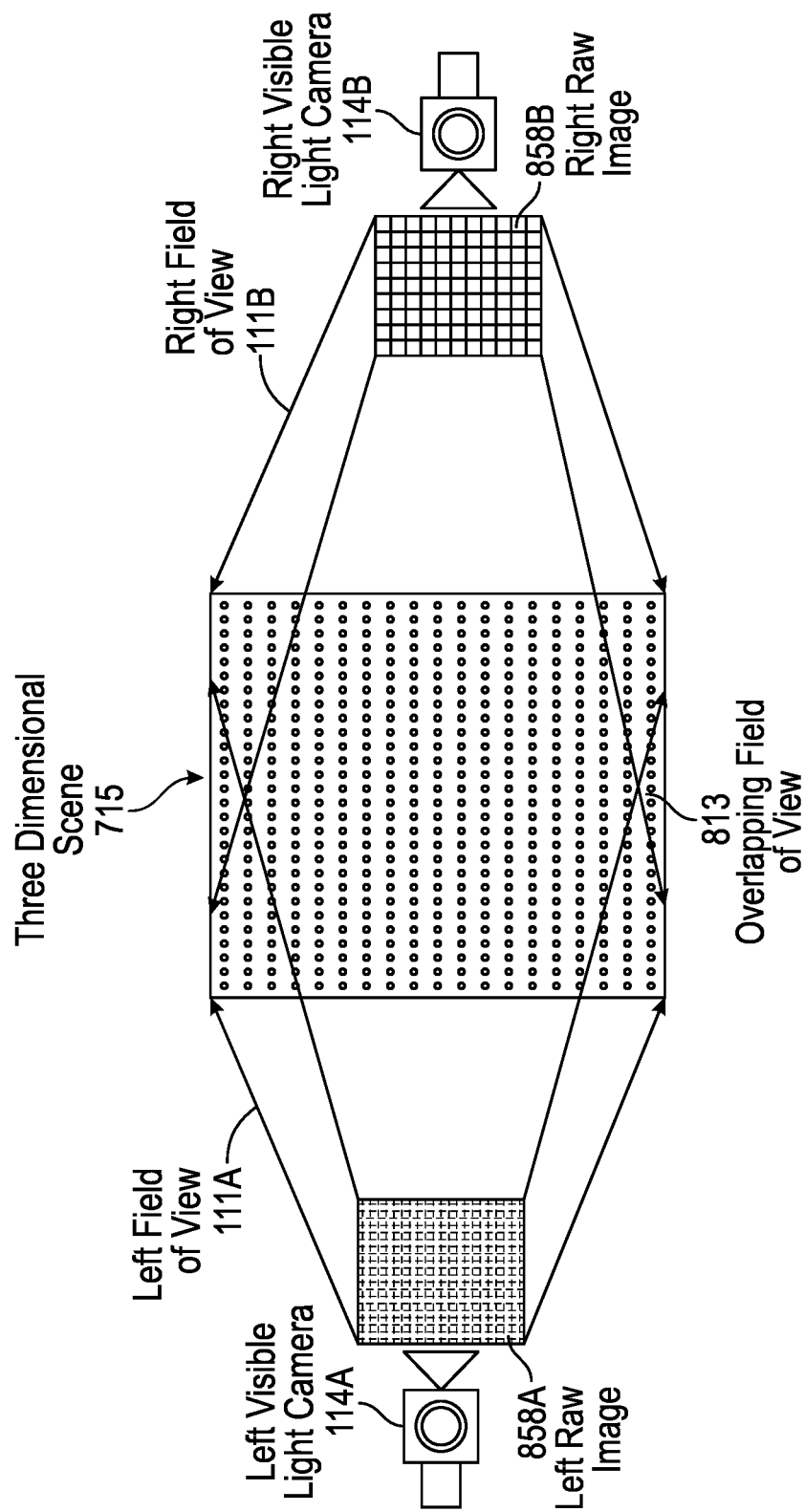
FIG. 3 is a diagrammatic depiction of a three-dimensional scene, a left raw image captured by a left visible-light camera, and a right raw image captured by a right visible-light camera.

FIG. 3 is a diagrammatic depiction of a three-dimensional scene 715, a left raw image 858A captured by a left visible-light camera 114A, and a right raw image 858B captured by a right visible-light camera 114B. The left field of view 111A may overlap, as shown, with the right field of view 111B. The overlapping field of view 813 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 858A, 858B may be processed to include a timestamp, which allows the images to be displayed together as part of a three-dimensional projection.

For the capture of stereo images, as illustrated in FIG. 3, a pair of raw red, green, and blue (RGB) images are captured of a real scene 715 at a given moment in time—a left raw image 858A captured by the left camera 114A and right raw image 858B captured by the right camera 114B. When the pair of raw images 858A, 858B are processed (e.g., by the image processor 912), depth images are generated. The generated depth images may be viewed on an optical assembly 180A, 180B of an eyewear device, on another display (e.g., the image display 880 on a mobile device 890), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, and/or a blue pixel light value); a position attribute (e.g., an X location coordinate, a Y location coordinate, and a Z location coordinate); a texture attribute and/or a reflectance attribute. The texture attribute quantifies the perceived texture of the depth image, such as the spatial arrangement of color or intensities in a region of vertices of the depth image.

In one example, the video composition and sharing system 1000 includes the eyewear device 100, which includes a frame 105 and a left temple 110A extending from a left lateral side 170A of the frame 105 and a right temple 110B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 858A from the left side of scene 715. The eyewear device 100 further includes a right visible-light camera 114B with a right field of view 111B. The right camera 114B is connected to the frame 105 or the right temple 110B to capture a right raw image 858B from the right side of scene 715.

FIG. 1B is a top cross-sectional view of a right chunk 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left chunk 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 226B connects the right chunk 110B to a right temple 125B of the eyewear device 100. In some examples, components of the right visible-light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
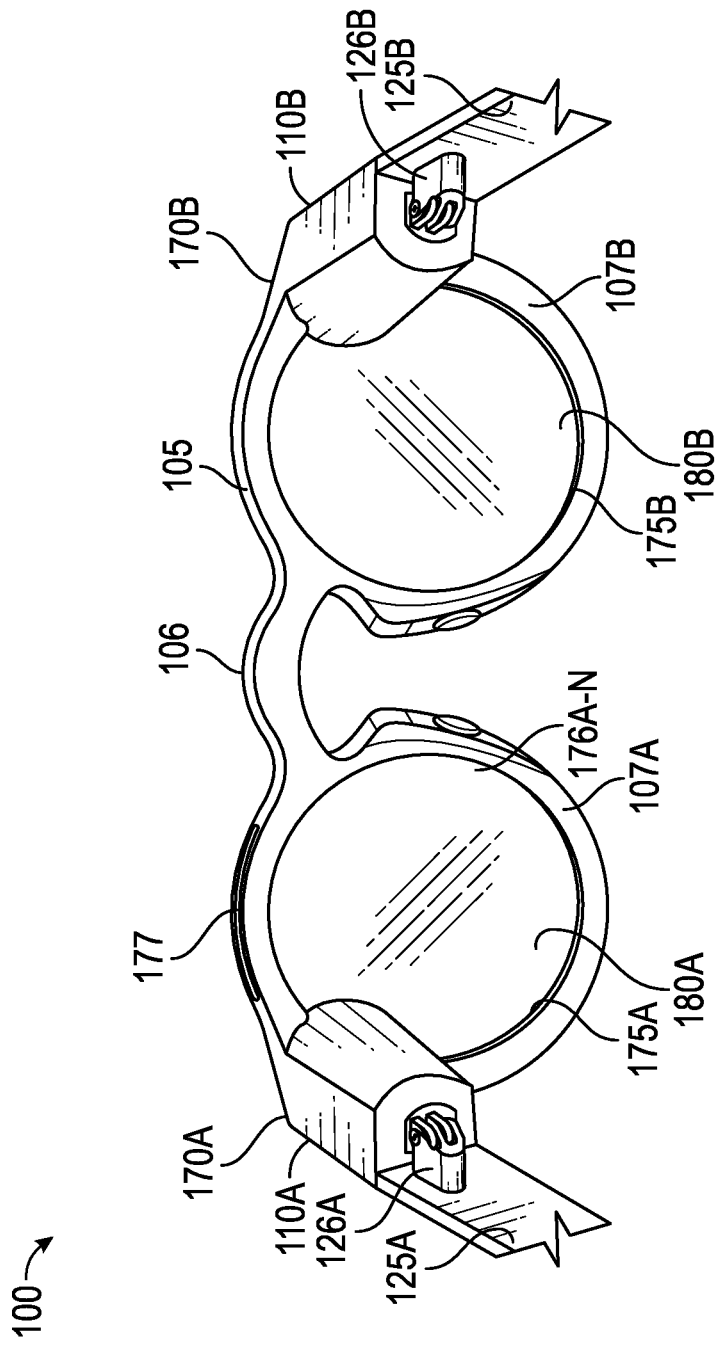
FIGS. 2A and 2B are rear views of example hardware configurations of an eyewear device utilized in the video composition and sharing system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right chunk 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right chunk 110B in which an opening is formed with an outward-facing angle of coverage, but in a different outwardly direction. The coupling can also be indirect via intervening components.

As shown in FIG. 1B, flexible PCB 140B is disposed inside the right chunk 110B and is coupled to one or more other components housed in the right chunk 110B. Although shown as being formed on the circuit boards of the right chunk 110B, the right visible-light camera 114B can be formed on the circuit boards of the left chunk 110A, the temples 125A, 125B, or the frame 105.

Figure 2B:
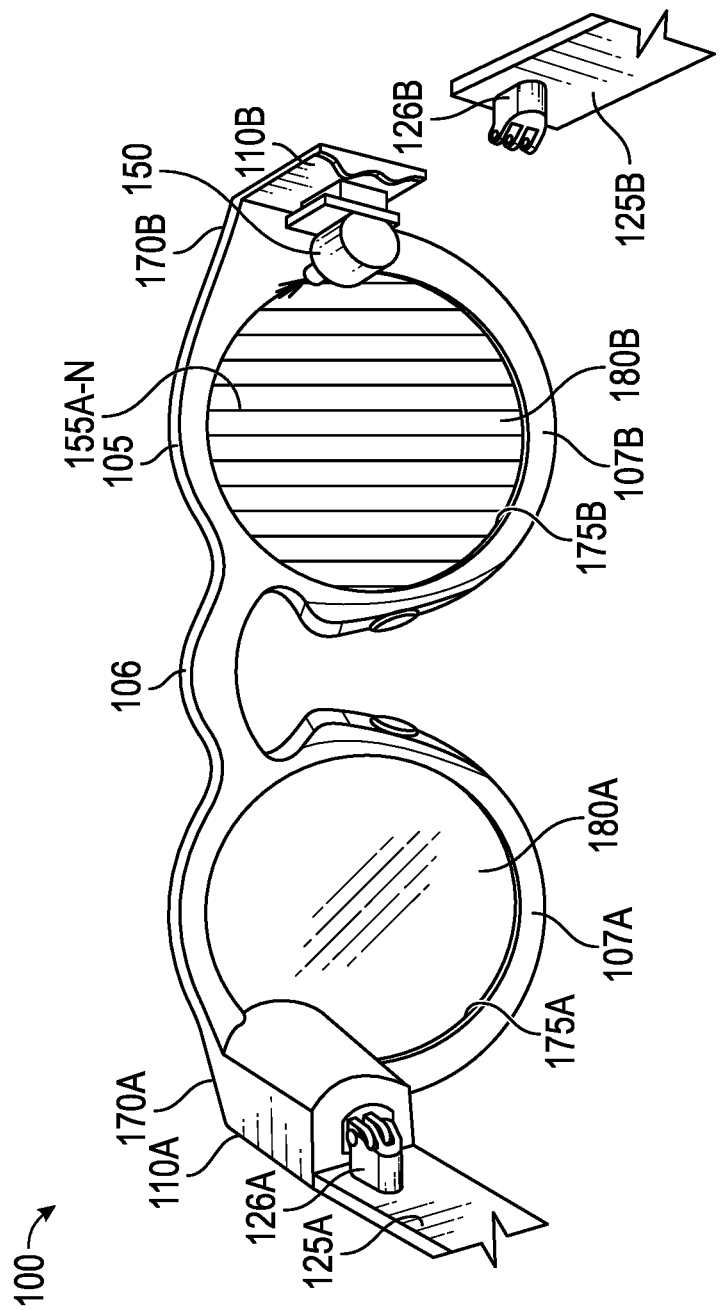

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved and/or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective sides 170A, 170B (as illustrated) or implemented as separate components attached to the frame 105 on the respective sides 170A, 170B. Alternatively, the chunks 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 912 on the eyewear device 100 may execute programming to apply the voltage to the LCD layer in order to create an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B and/or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective lateral sides 170A, 170B (as illustrated) or implemented as separate components attached to the frame 105 on the respective sides 170A, 170B. Alternatively, the chunks 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) and/or a left set of optical strips 155'A, 155'B, . . . 155'N (155 prime, A through N, not shown) which are configured to interact with light from the left projector 150A. Similarly, the right optical assembly 180B may include a right display matrix 177B (not shown) and/or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
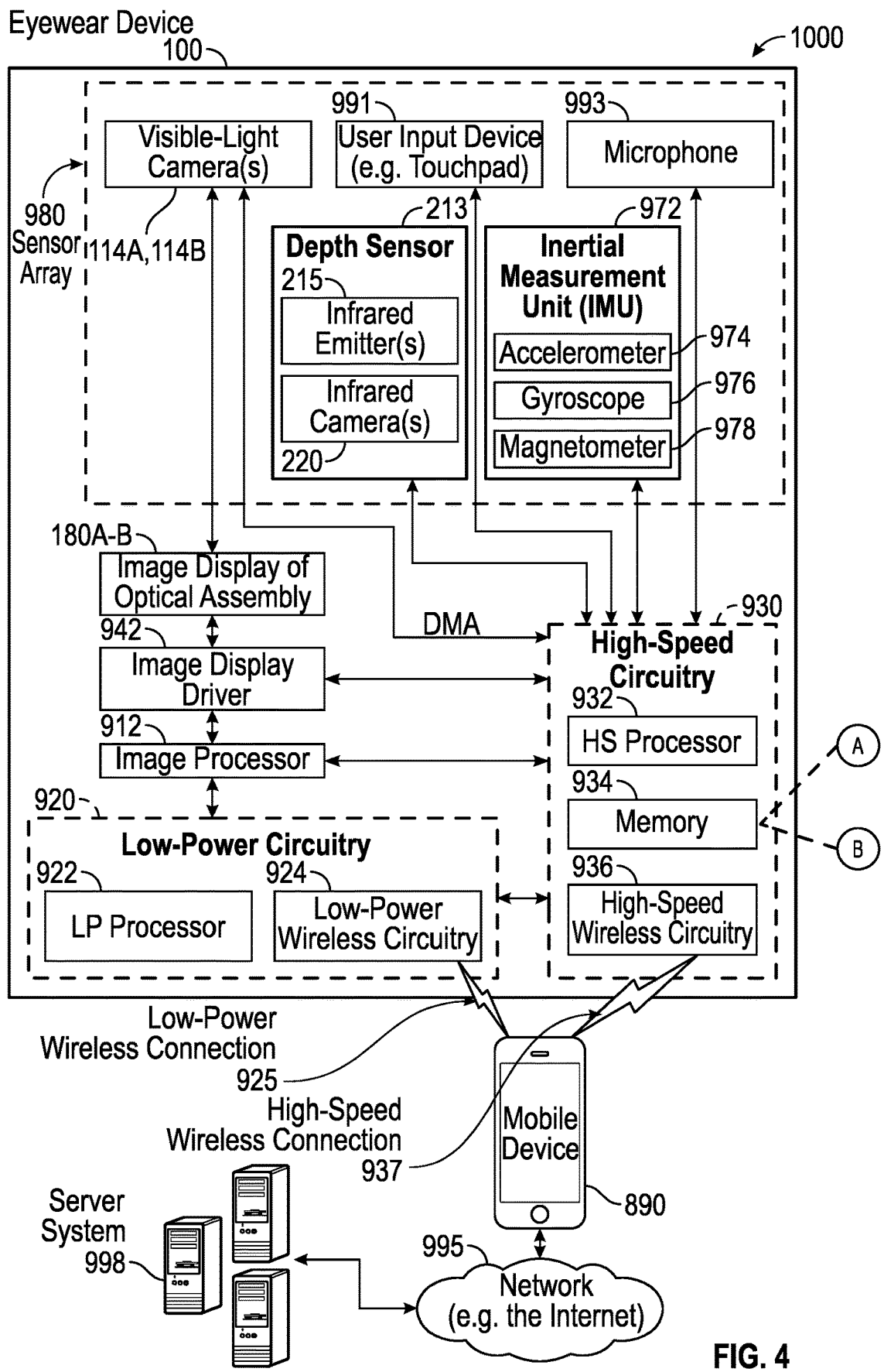
FIG. 4 is a functional block diagram of an example video composition and sharing system including an eyewear device, a mobile device, and a server system connected via various networks.
Figure 4:
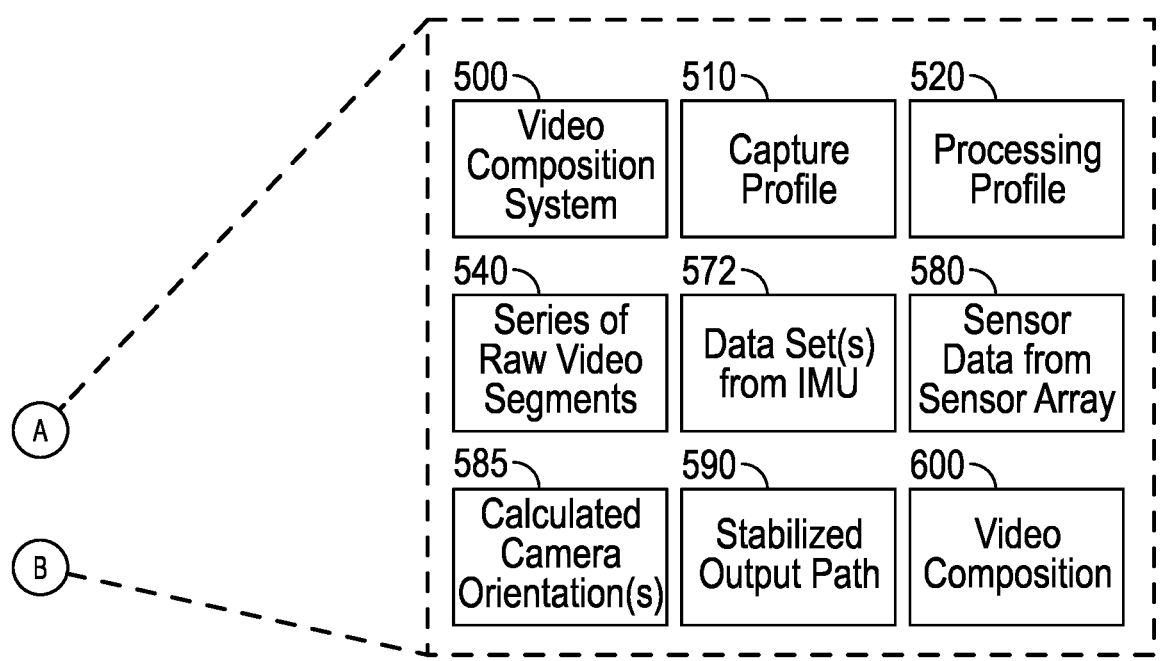

FIG. 4 is a functional block diagram of an example video composition and sharing system 1000 including an eyewear device 100, a mobile device 890, and a server system 998 connected via various networks 995 such as the Internet. The system 1000 includes a low-power wireless connection 925 and a high-speed wireless connection 937 between the eyewear device 100 and a mobile device 890, as shown.

The eyewear device 100 includes one or more visible-light cameras 114A, 114B which may be capable of capturing still images and/or video, as described herein. The cameras 114A, 114B may have a direct memory access (DMA) to high-speed circuitry 930. A pair of cameras 114A, 114B may function as a stereo camera, as described herein. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 220.

The eyewear device 100 further includes two image displays of each optical assembly 180A, 180B (one associated with the left side 170A and one associated with the right side 170B). The eyewear device 100 also includes an image display driver 942, an image processor 912, low-power circuitry 920, and high-speed circuitry 930. The image displays of each optical assembly 180A, 180B are for presenting images, including still images and video. The image display driver 942 is coupled to the image displays of each optical assembly 180A, 180B in order to control the images displayed. The eyewear device 100 further includes a user input device 991 (e.g., a touch sensor or touchpad) to receive a two-dimensional input selection from a user.

The components shown in FIG. 4 for the eyewear device 100 are located on one or more circuit boards, for example a PCB or flexible PCB, located in the rims or temples. Alternatively, or additionally, the depicted components can be located in the chunks, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 100 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 100, as can other elements of the network 995.

Memory 934 includes any storage device capable of storing various data and applications, including, among other things, camera data generated by the left and right visible-light cameras 114A, 114B, the infrared camera(s) 220, the image processor 912, and images generated for display by the image display driver 942 on the image display of each optical assembly 180A, 180B. Although the memory 934 is shown as integrated with high-speed circuitry 930, the memory 934 in other examples may be an independent, standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 5:
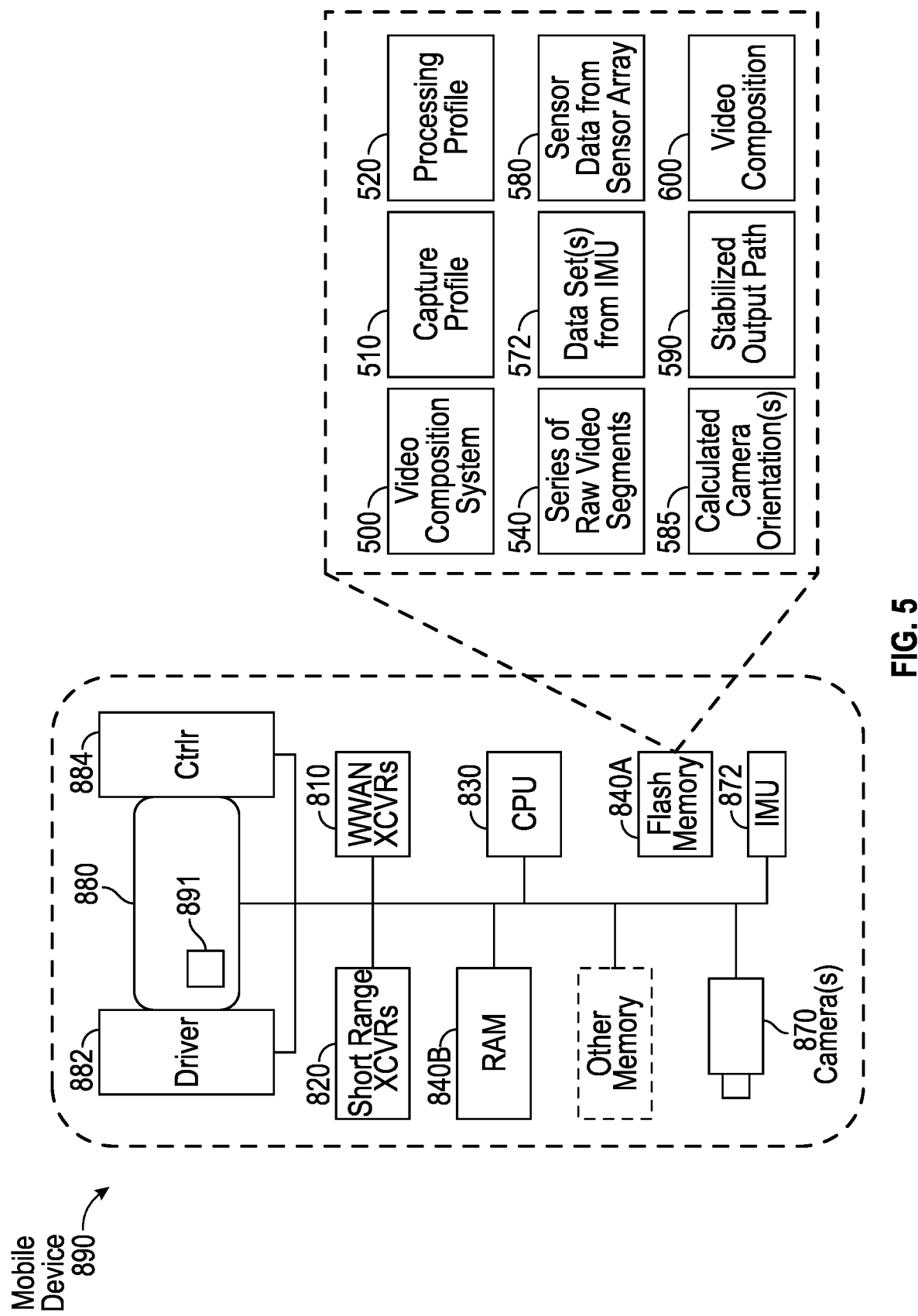
FIG. 5 is a diagrammatic representation of an example hardware configuration for a mobile device of the video composition and sharing system of FIG. 4.

As shown in FIG. 4, the high-speed processor 932 of the eyewear device 100 can be coupled to the camera system (visible-light cameras 114A, 114B), the image display driver 942, the user input device 991, and the memory 934. As shown in FIG. 5, the CPU 830 of the mobile device 890 may be coupled to a camera system 870, a mobile display driver 882, a user input layer 891, and a memory 840A. The eyewear device 100 can perform all or a subset of any of the functions described herein which result from the execution of the video composition system 500 in the memory 934 by the processor 932 of the eyewear device 100. The mobile device 890 can perform all or a subset of any of the functions described herein which result from the execution of the video composition system 500 in the flash memory 840A by the CPU 830 of the mobile device 890. Functions can be divided in the video composition system 500 such that the eyewear device 100 captures the video, collects IMU data, and gathers sensor data, and the mobile device 890 performs the calculating, computing, and combining functions.

The server system 998 may be one or more computing devices as part of a service or network computing system, for example, that include a processor, a memory, and network communication interface to communicate over the network 995 with an eyewear device 100 and a mobile device 890.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), and/or an outward-facing signal (e.g., an LED, a loudspeaker). The image displays of each optical assembly 180A, 180B are driven by the image display driver 942. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location and/or force of touches or touch gestures, or other tactile-configured elements), and audio input components (e.g., a microphone), and the like. The mobile device 890 and the server system 998 may include alphanumeric, pointer-based, tactile, audio, and other input components.

In some examples, the eyewear device 100 includes a sensor array 980, as shown in FIG. 4. Elements of the sensor array 980 include the visible-light camera(s) 114A, 114B, a user input device 991 (e.g., a touch screen or touchpad, a button switch), a microphone 993 (e.g., an array of two or more microphones), a depth sensor 213, and a collection of motion-sensing components referred to as an inertial measurement unit 972. The motion-sensing components may be micro-electro-mechanical systems (MEMS) with microscopic moving parts, often small enough to be part of a microchip.

The inertial measurement unit (IMU) 972 in some example configurations includes an accelerometer 974, a gyroscope 976, and a magnetometer 978. The accelerometer 974 senses the linear acceleration of the device 100 (including the acceleration due to gravity) relative to three orthogonal axes (x, y, z). The gyroscope 976 senses the angular velocity of the device 100 about three axes of rotation (pitch, roll, yaw). Together, the accelerometer 974 and gyroscope 976 can provide position, orientation, and motion data about the device relative to six axes (x, y, z, pitch, roll, yaw). The magnetometer 978 senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 100. For example, the acceleration data gathered from the accelerometer 974 can be integrated to obtain the velocity relative to each axis (x, y, z); and integrated again to obtain the position of the device 100 (in linear coordinates, x, y, and z). The angular velocity data from the gyroscope 976 can be integrated to obtain the position of the device 100 (in spherical coordinates). The programming for computing these useful values may be stored in memory 934 and executed by the high-speed processor 932 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The video composition and sharing system 1000, as shown in FIG. 4, includes a computing device, such as mobile device 890, coupled to an eyewear device 100 over a network. The sensor array 980 of the eyewear device 100, as described herein, includes one or more visible-light cameras 114A, 114B for capturing a series of raw video segments, an inertial measurement unit 972 for collecting data about the position, orientation, and motion of the eyewear device 100.

The video composition and sharing system 1000 further includes a memory for storing instructions, including those in a video composition system 500, and a processor for executing the instructions. The system 1000 may utilize the memory 934 of the eyewear device 100 and/or the memory elements 840A, 840B of the mobile device 890 (FIG. 5). Also, the system 1000 may utilize the processor elements 932, 922 of the eyewear device 100 and/or the central processing unit (CPU) 830 of the mobile device 890 (FIG. 5). Furthermore, the system 1000 may further utilize the memory and processor elements of the server system 998. In this aspect, the memory and processing functions of the video composition and sharing system 1000 can be shared or distributed across the eyewear device 100 and the mobile device 890 and/or the server system 998.

The mobile device 890 may be a smartphone, tablet, laptop computer, access point, or any other such device capable of connecting with eyewear device 100 using both a low-power wireless connection 925 and a high-speed wireless connection 937. Mobile device 890 is connected to server system 998 and network 995. The network 995 may include any combination of wired and wireless connections.

FIG. 5 is a high-level functional block diagram of an example mobile device 890. Mobile device 890 includes a flash memory 840A which includes programming to perform all or a subset of the functions described herein. Mobile device 890 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 890 includes an image display 880, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content As shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Referring again to FIG. 4, the video composition and sharing system 1000 includes an eyewear device 100 coupled to a mobile device 890 over a network 995. The memory 934 includes a video composition system 500, a capture profile 510, and a processing profile 520. Execution of the instructions of the video composition system 500 by the processor 932 configures the eyewear device 100—in accordance with the capture profile 510—to capture a series 540 of raw video segments and to collect a data set 572 associated with each video segment in the series 540. Each data set 572 includes information about the camera orientation collected by the IMU 972. In some implementations, each data set 572 includes information about the camera orientation associated with each and every frame in each video segment.

After the series 540 of video segments is captured, according to one implementation, the continued execution of the instructions of the video composition system 500 by the mobile CPU 830 configures the mobile device 890 to process the series 540 of video segments in accordance with the processing profile 520. The processing profile 520 in some example configurations includes a stabilization setting. Example stabilization settings include No (do not perform stabilization during processing), Yes, and Custom (wherein the user selects a particular type of stabilization). The default stabilization setting may be set to Yes and may include instructions to (1) calculate a camera orientation 585 associated with each raw video segment, based on the data set 572 associated with each particular video segment, (2) compute a stabilized output path 590 based on the calculated camera orientation(s) 585, and (3) combine the series 540 of video segments in accordance with the stabilized output path 590 to produce a video composition 600.

The capture profile 510 is a set of conditions or variables which determine how and when the camera(s) 114A, 114B on the eyewear device 100 will capture the series 540 of raw video segments. In one example, the capture profile 510 includes a start condition, a segment duration, a pause duration (between segments), and a quantity of segments. For example, a capture profile 510 may include a start condition equal to 9:18 p.m., a segment duration of six seconds, a pause duration of twenty seconds, and a quantity of ten segments. In accordance with this capture profile, the video cameras 114A, 114B on the eyewear device 100 would capture ten six-second video segments, with a twenty-second pause between each segment, starting at 9:18 p.m. This example capture profile 510 is referred to as a fixed capture profile because the conditions are set in advance of the video capturing and do not change.

The series 540 of raw video segments includes at least a first and a second raw video segment. The first raw video segment includes a plurality of first frames. The second raw video segment includes a plurality of second frames, and so forth.

The inertial measurement unit (IMU) 972 of the eyewear device 100 collects information about the position, orientation, and motion of the eyewear device 100 during capturing. The video composition system 500 configures the eyewear device 100 to collect data form the IMU during the process of capturing each video segment. The eyewear device 100 will collect a first data set from the IMU 972 during the capturing of the first raw video segment; then collect a second data set from the IMU 972 during the capturing of the second raw video segment, and so forth until capturing the quantity of segments specified in a particular capture profile 510. Each data set from the IMU 972 is associated with at least one frame of the raw video segment being captured. In some implementations, the eyewear device 100 will collect a first data set from the IMU 972 that is associated with each and every first frame of the first raw video segment. The data set(s) 572 collected from the IMU 972 may be stored in the memory 934, as shown in FIG. 4.

For each data set 572 stored in memory 934, the video composition system 500 configures the mobile device 890 to calculate a camera orientation 585. The camera orientation(s) 585 calculated by the mobile device 890 may be stored in the memory 840A, as shown in FIG. 5.

The video composition system 500 configures the mobile device 890 to compute a stabilized output path 590 that is based on the camera orientation 585 associated with each video segment. The stabilized output path 590 may be computed based on any of a variety of video stabilization algorithms and processes, including those used in time-lapse photography and other video composition systems. In some implementations, the stabilized output path 590 is a hypothetical, three-dimensional course traveled by the camera from the first raw video segment to the last. The camera orientation 585 associated with each video segment includes discrete positions and orientations (x, y, z, pitch, roll, yaw) which can be used to plot waypoints along this hypothetical course traveled by the camera. One or more frames in each video segment can be moved or otherwise adjusted so that each waypoint lies along the stabilized output path 590. In some algorithms, one or more frames in each video segment can be moved or otherwise adjusted so that each frame is stable relative to a reference plane, such as a wall, a table, or the horizon. Placing one or more frames of each video segment along the stabilized output path 590 produces a final video composition 600 that is smoother and more stabilized, compared to the series 540 of raw video segments.

In some example implementations, the execution of the instructions of the video composition system 500 configures the eyewear device 100—in accordance with the capture profile 510—to gather sensor data 580, which includes information collected by the sensor array 980. The sensor array 980 includes the camera(s) 114A, 114B, a user input device 991 such as a touchpad, a microphone 993, a depth sensor 213, and the inertial measurement unit (IMU) 972. In this example, the capture profile 510 is a reactive capture profile; instead of a fixed set of conditions, the conditions are reactive to sensor data 580 gathered in real time from the sensor array 980. For example, the reactive capture profile may include a reactive start condition configured to start recording when the sensor data 580 includes a start input. The start input could be an audible start command received by the microphone 993 in the sensor array 980, a physical start command received by the input device 991 (such as tap or tap pattern on the touchpad), a start gesture made by the wearer and captured by the camera(s) 114A, 114B, a select orientation of the eyewear device 100 (vertical, horizontal, still for a time) as indicated by the data set 572 collected by the IMU 972, or a select lighting condition as captured by the camera(s) 114A, 114B. The select orientation of the eyewear device 100 may include a position component and a time component. For example, a select orientation may include a substantially horizontal position (on the face, for example) held for a minimum time period (e.g., for a number of seconds without moving in excess of a threshold value). Similarly, a select orientation may include a substantially vertical position (e.g., in a pocket, hanging on a shirt collar) held for a minimum time period.

In another example, the reactive capture profile may include a reactive segment duration configured to adjust (prolong or shorten) a current segment duration when the sensor data 580 includes information from the microphone 993 which indicates a speech in progress. In this aspect, the current segment duration can be adjusted to avoid interrupting or cutting off the active speech of a user, observer, or other person near the eyewear device 100. During the capture of a raw video segment, the microphone 993 provides real-time sensor data 580. If an active speech is detected and it concludes prior to the planned or default segment duration, the current segment duration can be adjusted (shortened) to end after the speech concludes. If an active speech is detected and it continues in progress at or near the end of the planned or default segment duration, the current segment duration can be adjusted (prolonged) to end after the speech concludes. In one implementation, the current segment duration is adjusted to include (1) an active period lasting as long as the microphone indicates a speech in progress, and (2) a buffer period (a second or two, for example) after the microphone indicates the speech has ended, to avoid cutting off or abruptly ending the speech.

In a related aspect, a start input related to active speech can be used to adjust when to (a) end the pause between segments, and (b) start capturing a next raw video segment. The reactive capture profile may include a reactive pause duration that is configured to adjust (prolong or shorten) a current pause when the sensor data 580 includes information from the microphone 993 which indicates a speech in progress. This reactive setting avoids start a new raw video segment in the middle of an active speech. If active speech is detected and it continues in progress at or near the end of the planned or default pause duration, the current pause duration can be adjusted (prolonged) to end after the speech concludes. In one implementation, the current pause duration is adjusted to include (1) an active period lasting as long as the microphone indicates a speech in progress, and (2) a buffer period (a second or two, for example) after the microphone indicates the speech has ended, to avoid capturing the end of the speech in the next raw video segment. The end of the pause duration, or course, coincides with the beginning of the next raw video segment.

The reactive capture profile may include a reactive quantity of segments, such that the eyewear device 100 is configured to stop the current segment when sensor data 580 gathered in real time from the sensor array 980 includes a stop input. The stop input could be an audible stop command received by the microphone 993, a physical stop command received by the input device 991 (such as tap or tap pattern on the touchpad), a stop gesture made by the wearer and captured by the camera(s) 114A, 114B, a stop camera orientation as indicated by the data set 572 collected by the IMU 972, a stop lighting condition as captured by the camera(s) 114A, 114B, or a low-battery or zero-charge condition indicated by the eyewear device 100.

The reactive capture profile may include a reactive camera identifier, such that the eyewear device 100 is configured to activate a particular camera (left, right, both) in response to sensor data 580 gathered in real time from the sensor array 980. For example, if the ambient conditions sensed by the left camera 114A indicates the nearby lighting level is inadequate (e.g., completely dark, obstructed, too dim or too bright to capture usable video), the device 100 may deactivate the left camera 114A and activate the right camera 114B, in accordance with the reactive camera identifier. In another example, the device may activate both cameras 114A, 114B to record in stereo (for later viewing in 3D) when the sensor data 580 gathered in real time from the sensor array 980 suggests that the ambient conditions or device movement is particularly well suited for composition and later display in 3D.

In another aspect, the capture profile 510 may include one or more settings that control a user-facing indicator and/or an outward-facing signal. The user-facing indicator is sized, shaped, and positioned to alert or inform the wearer of the eyewear device 100 about an event. For example, a user-facing LED may be configured to turn on when recording begins, or a user-facing loudspeaker may be configured to emit a tone when recording ends. The user-facing indicator in some examples is a tactile signal generated by a vibrating actuator connected to the eyewear device 100, or an audible sound from a loudspeaker connected to the eyewear device 100.

The outward-facing signal is sized, shaped, and positioned to alert or inform an observer other than the wearer of the eyewear device 100 about an event. For example, an outward-facing LED may be configured to turn on while recording is in progress, to inform observers that a video capture is in progress.

The processing profile 520 in some examples includes a stabilization setting (e.g., no, yes, a custom selection of a particular stabilization algorithm), an interval effect (a visual effect to apply between segments, if any; e.g., cut, dissolve, fade, wipe), a visual layer (e.g., toning, color wash, border, frame, overlay elements), an audio layer (e.g., silence, the ambient sound, a musical soundtrack, a voice-over narration), and a playback speed (relative to the recording speed). Each setting may include a default setting, along with a user interface allowing the user to adjust each setting. For example, a processing profile 520 by default may include Yes for the stabilization setting, Cut for the interval effect (such that the video composition 600 is seamless between segments), None for the visual layer (no toning or added elements), Silence for the audio layer, and 2× for the playback speed.

In a related aspect the processing profile 520 may one or more reactive settings; that is, settings that change in accordance with the first or second data sets and/or the first or second camera orientations and/or the stabilized output path. For example, information within the first data set may suggest that a particular stabilization algorithm is well suited to the data. Information contained in the stabilized output path may suggest that a particular playback speed is well suited for the video composition during playback.

Any of the video composition and sharing functionality described herein for the eyewear device 100, the mobile device 890, and the server system 998 can be embodied in one more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of producing a video composition, comprising:
   capturing frames of raw video with a camera coupled to a wearable device in motion along a series of positions relative to a physical environment;
   collecting motion data with an inertial measurement unit coupled to the wearable device;
   computing a stabilized output path based on the collected motion data, such that the stabilized output path approximates the series of positions, wherein computing the stabilized output path comprises:
   (a) estimating a camera orientation associated with each of one or more of the frames of raw video, and (b) establishing one or more waypoints along the stabilized output path based on the camera orientations; and
   producing a video composition based on the stabilized output path, wherein producing the video composition comprises adjusting the one or more frames of raw video relative to the waypoints, such that at least a portion of the video composition appears stable relative to a reference plane.

2. The method of claim 1, wherein the step of adjusting further comprises:
   identifying the reference plane in the one or more captured frames of raw video;
   calculating a distance between the estimated camera orientations and the established waypoints; and
   mathematically adjusting one or more captured frames of raw video relative to the reference plane based on the calculated distance.

3. The method of claim 1, further comprising:
   dividing the captured frames of raw video into a series of raw video segments in accordance with a capture profile comprising a start condition, a segment duration, a pause duration, and a quantity of segments;
   estimating a first camera orientation associated with a first raw video segment based on the motion data;
   estimating a subsequent camera orientation associated with a subsequent raw video segment based on the motion data; and
   combining the series of raw video segments in accordance with the stabilized output path to produce the video composition.

4. The method of claim 3, wherein the wearable device comprises an electronic eyewear device, wherein the inertial measurement unit comprises an accelerometer, a gyroscope, and a magnetometer, and wherein said step of estimating the first camera orientation further comprises one or more of:
   collecting a first linear acceleration relative to three orthogonal axes from the accelerometer;
   collecting a first angular velocity relative to three axes of rotation from the gyroscope; and
   collecting a first heading relative to magnetic north from the magnetometer.

5. The method of claim 1, further comprising:
   dividing the frames of raw video into a series of raw video segments in accordance with a capture profile comprising a start condition, a segment duration, a pause duration, and a quantity of segments, wherein the capture profile comprises:
   a fixed capture profile, wherein the start condition is a clock time or a countdown, wherein the segment duration is a fixed period, wherein the pause duration is a fixed interval and wherein the quantity of segments is an integer, and
   a reactive capture profile, wherein one or more of the start condition, the segment duration, the pause duration, and the quantity of segments is a variable that is updated based on one or more of the frames of raw video and the motion data.

6. The method of claim 1, wherein the wearable device further comprises a microphone and a touchpad, and wherein the method further comprises:
   dividing the frames of raw video into a series of raw video segments in accordance with a capture profile comprising a start condition, a segment duration, a pause duration, and a quantity of segments,
   wherein the capture profile comprises a fixed capture profile and a reactive capture profile, and
   wherein the reactive capture profile comprises a reactive start condition configured to start the step of capturing frames of raw video in response to a start input selected from the group consisting of an audible start command received by the microphone, a physical start command received by the touchpad, a start gesture captured by the camera, a select orientation indicated by the inertial measurement unit, and a select lighting condition indicated by the camera.

7. The method of claim 6, wherein the select orientation is a condition selected from the group consisting of a substantially horizontal position held for a first minimum time period, a substantially vertical position held for a second minimum time period, a position held without substantial movement for a third minimum time period.

8. The method of claim 6, wherein the reactive capture profile further comprises:
   a reactive pause duration configured to start capturing a next raw video segment in response to the start input;
   a reactive segment duration configured to, during a current segment duration associated with a current video segment being captured, adjust the current segment duration to include (a) an active period as long as the audible start command from the microphone indicates a speech in progress and (b) a buffer period after the audible start command indicates an end of the speech; and a reactive quantity configured to, during a current segment duration associated with a current video segment being captured, terminate the current segment duration when the start input includes a stop input selected from the group consisting of an audible stop command received by the microphone, a physical stop command received by the touchpad, a stop gesture captured by the camera, a stop camera orientation indicated by the inertial measurement unit, a stop lighting condition indicated by the camera, and a low battery condition indicated by the wearable device.

9. An electronic eyewear device for producing a video composition, comprising:
a camera;
an inertial measurement unit;
a memory;
a processor coupled to the memory, the camera, and the inertial measurement unit; and
programming in the memory, wherein execution of the programming by the processor configures the electronic eyewear device to perform functions, including functions to:
capture frames of raw video with a camera coupled to a wearable device in motion along a series of positions relative to a physical environment;
collect motion data with an inertial measurement unit coupled to the wearable device;
compute a stabilized output path based on the collected motion data, such that the stabilized output path approximates the series of positions, wherein the function to compute the stabilized comprises functions to:
(a) estimate a camera orientation associated with one or more of the captured frames of raw video, and (b) establish one or more waypoints along the stabilized output path based on the camera orientations; and
produce a video composition based on the stabilized output path, wherein the function to produce the video composition comprises adjusting the one or more frames of raw video relative to the waypoints, such that at least a portion of the video composition appears stable relative to a reference plane.

10. The electronic eyewear device of claim 9, wherein the function to adjust further comprises functions to:
identify the reference plane in the one or more captured frames of raw video;
calculate a distance between the estimated camera orientations and the established waypoints; and
mathematically adjust one or more captured frames of raw video relative to the reference plane based on the calculated distance.

11. The electronic eyewear device of claim 9, wherein the programming when executed configures the electronic eyewear device to perform further functions to:
divide the captured frames of raw video into a series of raw video segments in accordance with a capture profile comprising a start condition, a segment duration, a pause duration, and a quantity of segments;
estimate a first camera orientation associated with a first raw video segment based on the motion data;
estimate a subsequent camera orientation associated with a subsequent raw video segment based on the motion data; and
combine the series of raw video segments in accordance with the stabilized output path to produce the video composition.

12. The electronic eyewear device of claim 11, wherein the inertial measurement unit comprises an accelerometer, a gyroscope, and a magnetometer, and wherein the function to estimate the first camera orientation further comprises functions to:
collect a first linear acceleration relative to three orthogonal axes from the accelerometer;
collect a first angular velocity relative to three axes of rotation from the gyroscope; and
collect a first heading relative to magnetic north from the magnetometer.

13. The electronic eyewear device of claim 9, wherein the programming when executed configures the electronic eyewear device to perform further functions to:
divide the captured frames of raw video into a series of raw video segments in accordance with a capture profile comprising a start condition, a segment duration, a pause duration, and a quantity of segments, wherein the capture profile comprises:
a fixed capture profile, wherein the start condition is a clock time or a countdown, wherein the segment duration is a fixed period, wherein the pause duration is a fixed interval and wherein the quantity of segments is an integer, and
a reactive capture profile, wherein one or more of the start condition, the segment duration, the pause duration, and the quantity of segments is a variable that is updated based on one or more of the frames of raw video and the motion data.

14. The electronic eyewear device of claim 9, wherein the wearable device further comprises a microphone and a touchpad, and wherein the programming when executed configures the electronic eyewear device to perform further functions to:
divide the captured frames of raw video into a series of raw video segments in accordance with a capture profile comprising a start condition, a segment duration, a pause duration, and a quantity of segments,
wherein the capture profile comprises a fixed capture profile and a reactive capture profile, and
wherein the reactive capture profile comprises a reactive start condition configured to start the function to capture frames of raw video in response to a start input selected from the group consisting of an audible start command received by the microphone, a physical start command received by the touchpad, a start gesture captured by the camera, a select orientation indicated by the inertial measurement unit, and a select lighting condition indicated by the camera.

15. The electronic eyewear device of claim 14, wherein the reactive capture profile further comprises:
a reactive pause duration configured to start capturing a next raw video segment in response to the start input;
a reactive segment duration configured to, during a current segment duration associated with a current video segment being captured, adjust the current segment duration to include (a) an active period as long as the audible start command from the microphone indicates a speech in progress and (b) a buffer period after the audible start command indicates an end of the speech; and
a reactive quantity configured to, during a current segment duration associated with a current video segment being captured, terminate the current segment duration when the start input includes a stop input selected from the group consisting of an audible stop command received by the microphone, a physical stop command received by the touchpad, a stop gesture captured by the camera, a stop camera orientation indicated by the inertial measurement unit, a stop lighting condition indicated by the camera, and a low battery condition indicated by the wearable device.

16. A non-transitory computer-readable medium storing program code that, when executed, is operative to cause a processor of an electronic eyewear device to perform the steps of:

capturing frames of raw video with a camera coupled to a wearable device in motion along a series of positions relative to a physical environment;

collecting motion data with an inertial measurement unit coupled to the wearable device;

computing a stabilized output path based on the collected motion data, such that the stabilized output path approximates the series of positions, wherein the step of computing the stabilized output path comprises the steps of:

(a) estimating a camera orientation associated with one or more of the captured frames of raw video, (b) establishing one or more waypoints along the stabilized output path based on the camera orientations, (c) identifying a reference plane in the one or more captured frames of raw video, (d) calculating a distance between the camera orientations and the waypoints, and (e) mathematically adjusting one or more captured frames of raw video relative to the reference plane based on the calculated distance; and producing a video composition based on the stabilized output path, wherein producing the video composition comprises mathematically adjusting the one or more frames of raw video relative to the waypoints, such that at least a portion of the video composition appears stable relative to the reference plane.

17. The non-transitory computer-readable medium storing program code of claim 16, wherein the program code when executed is operative to cause the processor to perform the further steps of:

dividing the captured frames of raw video into a series of raw video segments in accordance with a capture profile comprising a start condition, a segment duration, a pause duration, and a quantity of segments;

estimating a first camera orientation associated with a first raw video segment based on the motion data; and combining the series of raw video segments in accordance with the stabilized output path to produce the video composition.

* * * * *